(12) United States Patent
Shamoun et al.

(10) Patent No.: US 12,103,839 B2
(45) Date of Patent: *Oct. 1, 2024

(54) LIQUID CRYOGEN DELIVERY AND INJECTION CONTROL APPARATUS

(71) Applicant: Messer Industries USA, Inc., Bridgewater, NJ (US)

(72) Inventors: Simon Shamoun, Acworth, GA (US); Isaiah Edmonds, West Windsor, NJ (US); Michael Newman, Hillsborough, NJ (US)

(73) Assignee: Messer Industries USA, Inc., New Castle, DE (US)

( * ) Notice: Subject to any disclaimer, the term of this patent is extended or adjusted under 35 U.S.C. 154(b) by 998 days.

This patent is subject to a terminal disclaimer.

(21) Appl. No.: 16/940,424

(22) Filed: Jul. 28, 2020

(65) Prior Publication Data

US 2022/0033239 A1    Feb. 3, 2022

(51) Int. Cl.
*B67D 1/00*      (2006.01)
*A23B 4/06*      (2006.01)
(Continued)

(52) U.S. Cl.
CPC ............ *B67D 1/0071* (2013.01); *A23B 4/066* (2013.01); *A23B 4/09* (2013.01); *A23L 3/001* (2013.01);
(Continued)

(58) Field of Classification Search
CPC .. B67D 1/0071; B67D 1/0003; B67D 1/0066; B67D 1/0076; A23B 4/066; A23B 4/09;
(Continued)

(56) References Cited

U.S. PATENT DOCUMENTS 4,627,244 A * 12/1986  Willhoft ............... F25D 29/001
                                                  73/19.1
5,038,571 A *  8/1991  Yokouchi .............. C09K 5/045
                                                  62/51.1
(Continued)

FOREIGN PATENT DOCUMENTS

| EP | 1152203 A1 | 11/2001 |
| EP | 1612495 A1 | 1/2006 |
| WO | 2009032709 A1 | 3/2009 |

OTHER PUBLICATIONS

PCT International Search Report for PCT/US2010/051928, mailed May 31, 2011, Authorized Officer: Anita Lucic, 2 pgs.

*Primary Examiner* — Jenna M Maroney
(74) *Attorney, Agent, or Firm* — Joshua L. Cohen

(57) ABSTRACT

A delivery apparatus and method for delivering liquid cryogen to a chilling application includes a liquid cryogen feed tank; a liquid cryogen conduit in fluid communication between the feed tank and the chilling application; a weight measurement device for controlling the weight of liquid cryogen to be delivered to the chilling application through the conduit; a flow controller for controlling the speed of delivery of the liquid cryogen to the chilling application; wherein the chilling application uses the liquid cryogen to produce an exhaust gas; a device for measuring the temperature of the exhaust gas, the device in operative communication with the flow controller; wherein the flow controller is configured to vary the speed of delivery of liquid cryogen in response to the temperature of the exhaust gas.

11 Claims, 2 Drawing Sheets

(51) Int. Cl.
  *A23B 4/09*    (2006.01)
  *A23L 3/00*    (2006.01)
  *A23L 3/36*    (2006.01)
  *A23L 3/375*   (2006.01)
  *A47J 43/07*   (2006.01)
  *B67D 7/08*    (2010.01)

(52) U.S. Cl.
  CPC ............ *A23L 3/363* (2013.01); *A23L 3/375* (2013.01); *A47J 43/0716* (2013.01); *B67D 1/0003* (2013.01); *B67D 1/0066* (2013.01); *B67D 1/0076* (2013.01); *B67D 1/0077* (2013.01); *B67D 7/08* (2013.01); *A23V 2002/00* (2013.01)

(58) Field of Classification Search
  CPC .......... A23L 3/001; A23L 3/363; A23L 3/375; A47J 43/0716
  USPC ........................................................ 62/50.2
  See application file for complete search history.

(56) References Cited

U.S. PATENT DOCUMENTS

| | | | | |
|---|---|---|---|---|
| 5,186,008 A * | 2/1993 | Appolonia | ............... | F25D 3/11 62/266 |
| 5,214,925 A * | 6/1993 | Hoy | ...................... | F04B 15/06 62/50.1 |
| 5,394,704 A * | 3/1995 | Johnson | ............... | F17C 13/026 62/122 |
| 8,474,273 B2 * | 7/2013 | Gibson | ................ | F25D 29/001 62/50.4 |
| 11,692,768 B2 * | 7/2023 | Shamoun | ............. | F25D 29/001 62/501 |
| 2006/0283197 A1 * | 12/2006 | Schon | ................. | A01N 1/0257 62/78 |
| 2012/0145279 A1 * | 6/2012 | Shamoun | ............. | F17C 13/023 141/83 |
| 2012/0171344 A1 * | 7/2012 | Rasanayagam | ......... | A23L 3/375 426/524 |

* cited by examiner

LIQUID CRYOGEN DELIVERY AND INJECTION CONTROL APPARATUS

BACKGROUND

The present embodiments relate to a liquid cryogen delivery apparatus for, and method of, delivering a liquid cryogen to applications such as processes which use the liquid cryogen and produce an exhaust gas.

Many commercial and industrial refrigeration and freezing applications utilize liquid refrigerating or cooling agents. In many cases, the liquid refrigeration or cooling agents are liquid cryogens, such as liquid nitrogen, liquid oxygen, liquid argon, and refrigerants such as liquid carbon dioxide, and the like.

Previously known methods of controlling liquid delivery include methods based upon volume or mass of liquid flowing through a conduit, time of injection, temperature of the products being cooled, and viscosity of the products being cooled.

Methods of controlling liquid delivery based on the temperature of the product being cooled, such as a food product or a product from another type of process, have various vulnerabilities. That is, the temperature probes utilized to measure the temperature of the product are difficult to keep clear of product build-up and other debris; "voids" in the product being cooled may result in the probe reading the temperature of the cryogen rather than the temperature of the product; and accurate temperature readings may be difficult to obtain.

Methods of controlling liquid delivery based on the viscosity of the products being cooled, such as in a blender or mixer, rely on sensing the mixer's or the blender's motor power, and require that the products undergo at least a partial phase change during the cooling process. Further, the amount of liquid utilized to cool the product cannot be accurately recorded without additional devices or apparatus, thereby resulting in increased cost and complexity of the system.

Further, it is sometimes necessary to provide a liquid cryogen at high pressure in order to ensure that the liquid cryogen is delivered quickly to a liquid utilizing process, in order to minimize the cooling loss during transit. In previously known methods, this typically requires a high-pressure bulk storage tank, which may be costly and inefficient to operate.

SUMMARY

Therefore, there is provided a delivery apparatus for delivering liquid cryogen to a chilling application, which includes a liquid cryogen feed tank; a liquid cryogen conduit in fluid communication between the liquid cryogen feed tank and the chilling application; a weight measurement device for controlling a weight of the liquid cryogen to be delivered to the chilling application through the liquid cryogen conduit; a flow controller for controlling a speed of delivery of the liquid cryogen to the chilling application; wherein the chilling application uses the liquid cryogen to produce an exhaust gas; a device for measuring a temperature of the exhaust gas, the device in operative communication with the flow controller; wherein the flow controller is configured to vary the speed of delivery of the liquid cryogen in response to the temperature of the exhaust gas.

Also provided is a method for supplying liquid cryogen to a chilling application, the chilling application using the liquid cryogen for producing an exhaust gas, the method including supplying liquid cryogen from a liquid cryogen feed tank to a liquid cryogen conduit in fluid communication between the liquid cryogen feed tank and the chilling application; controlling a weight of the liquid cryogen to be delivered to the chilling application through the liquid cryogen conduit by a weight measurement device; controlling a speed of delivery of the liquid cryogen to the chilling application by a flow controller; measuring a temperature of the exhaust gas with a device in operative communication the flow controller; and varying the speed of delivery of the liquid cryogen by a flow controller configured to vary the speed of delivery in response to the temperature of the exhaust gas.

Also provided is a delivery apparatus for delivering liquid nitrogen to a bottom injection mixer, including a low-pressure liquid nitrogen feed tank; a liquid nitrogen conduit in fluid communication between the low-pressure liquid nitrogen feed tank and the mixer, wherein the liquid nitrogen conduit feeds the liquid nitrogen to a plurality of injectors mounted to the mixer and communicating with an interior of the mixer; a weight measurement device for controlling a weight of the liquid nitrogen to be delivered through the liquid nitrogen conduit and the plurality of injectors to the mixer; a flow controller for controlling a speed of delivery of the liquid nitrogen to the mixer through the injectors; wherein the mixer uses the nitrogen liquid and produces an exhaust gas; a device for measuring a temperature of the exhaust gas, the device being in operative communication with the flow controller; wherein the flow controller is configured to vary the speed of the delivery of the liquid nitrogen in response to the temperature of the exhaust gas.

BRIEF DESCRIPTION OF THE DRAWING(S)

The accompanying drawings are included to provide a further understanding of the apparatus and method provided herein, and are incorporated in and constitute a part of this specification. The drawings illustrate embodiments of the apparatus and method provided herein and, together with the description, serve to explain the principles described herein, but are not intended to limit the specification or any of the claims. Like reference numerals are used to indicate like components, unless otherwise indicated.

DESCRIPTION

Figure 1:
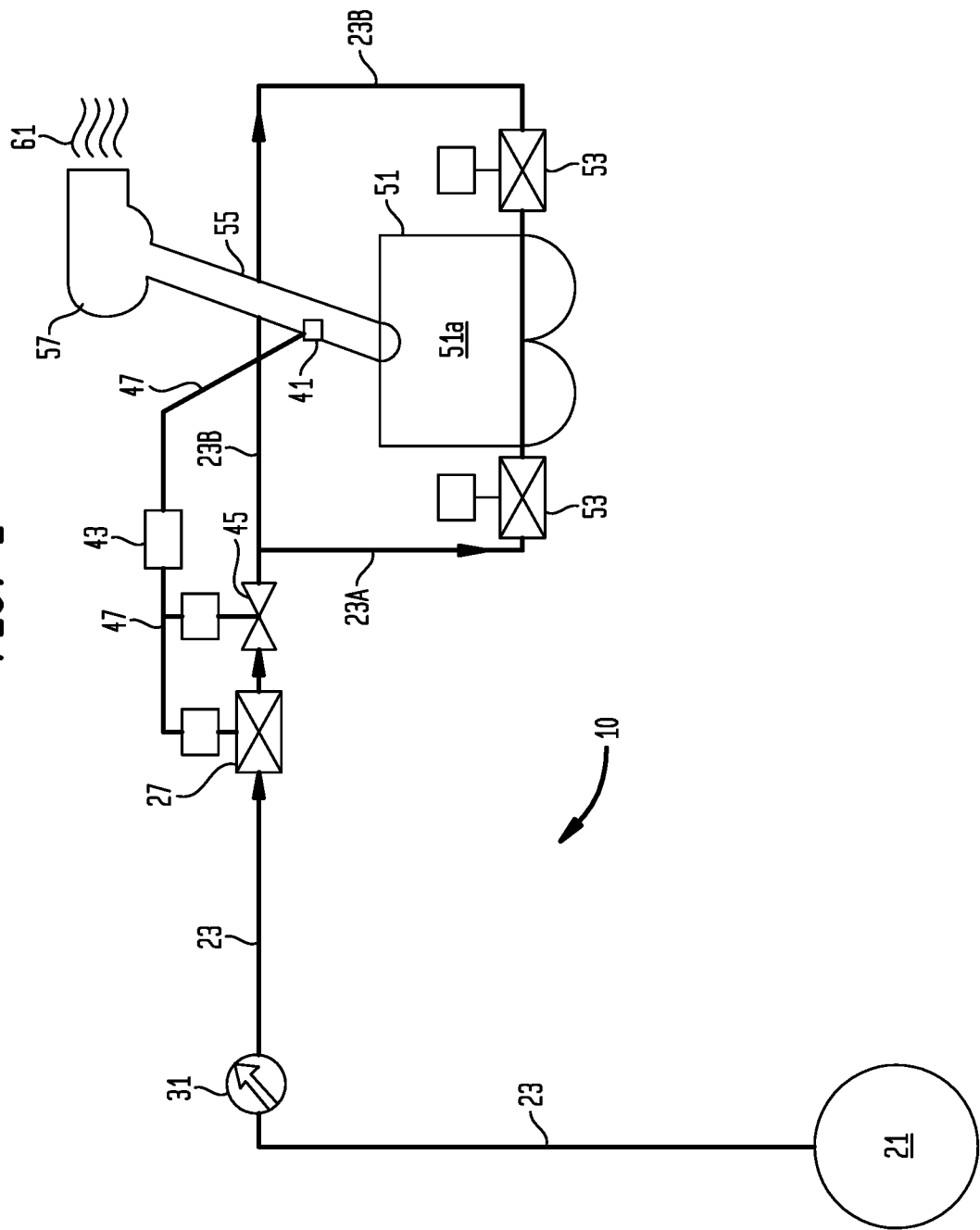
FIG. 1 is a schematic diagram of one embodiment of a liquid cryogen delivery apparatus.

The present embodiments are directed to a liquid cryogen delivery apparatus and method in which the flow of cryogen to a chilling application, which produces an exhaust gas during a cryogen injection cycle, may be varied during the injection cycle to improve efficiency. Such applications include, but are not limited to, cooling, chilling, refrigerating or freezing processes.

The flow variance can be controlled by directly measuring the exhaust gas temperature during the injection cycle. Exhaust gas temperatures drop during an injection cycle and with these so does overall efficiency. Exhaust gas temperature is used to regulate liquid cryogen. flow into the application. The flow itself may be regulated by using a flow control device or by regulating cryogen pressure in the apparatus itself.

As product is chilled during an injection cycle, the exhaust gas temperatures drop during the cycle time. The heat load of the product is reduced during the injection cycle, but typically the flow rate of cryogen is not. Therefore, what may be an efficient process at the start of an injection cycle may not be as efficient at its completion, as the product is cooled and cannot release its heat as readily to the injected liquid cryogen, which sublimates and/or vaporizes, and escapes out of the exhaust. There is no existing flow/temperature control system for chilling applications such as this.

For illustration, but not by means of limitation, such a product chilling application may comprise a blender or mixer for protein such as meat, having bottom injection nozzles for delivering liquid cryogen to the meat to effect cooling, chilling, refrigerating or freezing. Precise heat removal is required during a cryogen injection cycle, which in some embodiments may comprise a mixing period as short as 30 seconds, up to about 20 minutes, typically about five to ten minutes. Bottom injection nozzles, including the most state-of-the-art nozzles, are typically either on/off (open/closed), with 100% flow or no flow during injection cycles.

The present embodiments thus provide control and efficiency improvements of liquid cryogen injection apparatus for product chilling applications, improving the efficiency of the overall process and providing operators with a better means of achieving batch to batch chilling repeatability. The present embodiments do not change the heat transfer rate of the product chilling application but rather, control the amount and pressure of liquid cryogen that is delivered for the heat transfer to remain maximized and consistent. Thus, the pressure of the liquid cryogen delivered to the application may be reduced during the cryogen injection cycle as the product cools.

According to the present embodiments, a delivery apparatus for delivering liquid cryogen to a chilling application, which utilizes the liquid cryogen and produces an exhaust gas, includes a liquid cryogen feed tank; a liquid cryogen conduit in fluid communication between the feed tank and the application; a weight measurement device for controlling the weight of liquid cryogen to be delivered to the application through the conduit; a flow controller for controlling the speed of delivery of the liquid cryogen to the application; a device for measuring the temperature of the exhaust gas, which device is in operative communication with the flow controller; wherein the flow controller is configured to vary the speed of delivery of the liquid cryogen to the application in response to the temperature of the exhaust gas.

The delivery apparatus may include an electronic controller, for example an electronic processor such as a microprocessor or a computer, configured to receive a signal corresponding to the temperature of the exhaust gas and to send a control signal to the flow controller. The temperature of the gas may be measured by a thermocouple, resistance temperature detector (RTD) or the like.

In one embodiment, the weight measurement device is a flowmeter which controls the quantity of liquid cryogen to be delivered to the chilling application, and which may be capable of control by an operator. In other embodiments, the flow controller may be a pressure control device such as a control valve in operative communication with the temperature measuring device, which controls the speed at which the liquid cryogen is injected into the chilling application.

In another embodiment, the feed tank is in fluid communication with a vessel which is in fluid communication with the conduit. The vessel may be a subcooling or conditioning vessel for the liquid cryogen, and the weight measurement device may be a weigh scale or load cell supporting the vessel, to measure the amount of liquid cryogen remaining in the vessel, so as to control the amount of cryogen to be delivered to the chilling application. The flow controller is configured to vary the pressure in the vessel to vary the speed, i.e., pressure, of delivery of liquid cryogen to the conduit.

As the amount of cryogen being delivered though the conduit to the chilling application exceeds the product's capacity to transfer heat to it, the exhaust gas cools, signaling the diminished requirement for cryogen delivery. The drop in temperature of the exhaust gas is detected and measured by the temperature measuring device, which transmits a signal to the electronic or digital controller, which in turn sends a signal to the flow controller to decrease the speed, or pressure, of delivery of cryogen to the conduit and thus to the chilling application.

In certain embodiments, a high-pressure gaseous cryogen tank is in fluid communication with the vessel via a gas conduit, wherein a pressure control device, such as a control valve, in the gas conduit between the high-pressure gaseous cryogen tank and the vessel is responsive to the temperature of the exhaust gas via a control loop involving the temperature measuring device and the electronic controller.

The high-pressure gaseous cryogen tank provides the gaseous cryogen to the subcooling or conditioning vessel to pressurize the vessel and force liquid cryogen into the liquid cryogen conduit. It is to be understood that the gaseous cryogen is not mixed with the liquid cryogen, such that substantially all cryogen delivered to the liquid cryogen conduit and ultimately to the chilling application is in the liquid phase (other than a negligible amount of gas resulting from heat leaks in the system). For example, the gaseous cryogen may be delivered to the top of the vessel, forcing liquid cryogen out of a port in the bottom of the vessel. A control valve in the gas conduit between the gaseous cryogen tank and the vessel may control the flow rate, i.e., the speed, of delivery or injection of the liquid cryogen by varying the pressure in the vessel, actuated by the electronic or digital controller.

The subject method for supplying liquid cryogen to a chilling application, where the application utilizes the liquid cryogen and produces an exhaust gas, therefore comprises supplying liquid cryogen from a liquid cryogen feed tank to a liquid cryogen conduit in fluid communication between the feed tank and the application; controlling the weight of liquid cryogen to be delivered to the application through the conduit by a weight measurement device; controlling the speed, i.e. pressure, of delivery of the liquid cryogen to the application by a flow controller; measuring the temperature of the exhaust gas with a temperature measuring device in operative communication with the flow controller; and varying the speed, i.e., pressure, of delivery of the cryogen gas by a flow controller configured to vary the speed of delivery in response to the temperature of the exhaust gas.

The method includes receiving a signal corresponding to the temperature of the exhaust gas and sending a control signal to the flow controller. As discussed above, a temperature measuring device such as a thermocouple or resistance temperature detector (RTD) or the like, may be used for sensing the temperature of the exhaust gas, and transmitting a signal to an electronic or digital controller, which in turn sends a signal to the flow controller to decrease the speed of delivery of cryogen when the temperature of the exhaust gas falls below a particular temperature, which may be preset or determined by an operator.

In an embodiment in which the delivery apparatus includes the feed tank being in fluid communication with a vessel which is in fluid communication with the conduit, the method may include the flow controller varying the pressure in the vessel to vary the speed of delivery of liquid cryogen to the conduit. For example, the vessel pressure can be increased or decreased by varying the vapor pressure in the headspace at the top of the vessel to control the flow of liquid out of a bottom port.

In certain of these embodiments, a high-pressure gaseous cryogen tank is in fluid communication with the vessel via a gas conduit, and a pressure control device, such as a pressure regulator or control valve, in the gas conduit between the high-pressure gaseous cryogen tank and the vessel is responsive to the temperature of the exhaust gas. The method thus includes varying the pressure of the liquid cryogen in the vessel by the pressure control device (such as a pressure regulator or control valve) varying the flow of cryogen gas to the vessel, as discussed above.

In certain of these embodiments, the method may include pulsing the delivery of liquid cryogen to the application at varying measured time intervals and/or exhaust gas temperature dependent intervals during a chilling cycle.

For illustration, but not for means of limitation, the apparatus and method for delivering cryogen will be described as applied to a product chilling application which comprises a blender or mixer for protein such as meat, having bottom injection nozzles for delivering liquid cryogen to the meat to effect cooling, refrigerating or freezing. However, it is to be understood that the apparatus and method may be used to deliver liquid cryogen to any product chilling application which utilizes liquid cryogen and produces an exhaust gas, such as but not limited to, a rotating tumbler, a cooking kettle, or a cryogen impingement tunnel.

Referring to FIG. 1, the apparatus 10 comprises at least one liquid cryogen feed tank 21 in fluid communication with a liquid cryogen conduit 23 and a chilling application which in this embodiment comprises a bottom injection, protein or meat mixer or blender 51. Feed tank 21 may comprise a low pressure (on the order of about 15 psi to about 75 psi), liquid nitrogen bulk storage tank. The liquid nitrogen is provided to the conduit 23 at about negative 320° F. (−196° C.). The term "feed tank" indicates that the feed tank 21 supplies or "feeds" the liquid cryogen to the liquid cryogen utilizing application.

Located between feed tank 21 and mixer/blender 51, in controlling communication with conduit 23, is a flowmeter 31 which controls or regulates the weight or quantity of liquid cryogen being delivered from feed tank 21 through conduit 23 to the mixer/blender 51. The amount of liquid cryogen to be delivered through flowmeter 31 may be preset by an operator, for example, in relation to a type and quantity of product to be chilled in a batch operation.

Liquid cryogen is delivered to the mixer/blender 51 via conduit 23 which may be split into two or more sections 23A, 23B to feed a plurality of liquid cryogen injectors 53 having nozzles (not shown) which inject the liquid cryogen directly into an interior 51a of the mixer/blender 51 vessel to contact the protein/meat being chilled therein. The protein/meat transfers its heat to the liquid cryogen, e.g. liquid nitrogen, which vaporizes upon heating into the corresponding gas, i.e., nitrogen gas. The gas passes from the mixer/blender 51 vessel to an exhaust duct 55; in some embodiments the exhaust gas 61 being drawn out of the interior 51a by a blower or exhaust fan 57. As the chilling process proceeds, the protein/meat reaches a temperature at which the release of its heat to the cryogen decreases, and colder cryogen gas escapes through the exhaust duct 55 with or as the exhaust gas 61.

According to the subject apparatus and method embodiments, the use of liquid cryogen in excess of what is practically needed can be avoided, but still achieve the desired amount of chilling of the protein/meat product. A temperature measuring device 41, such as a thermocouple or RTD, is positioned in exhaust duct 55 to detect when the exhaust gas 61 falls below a desired temperature or temperature range. The desired temperature for the exhaust gas is, of course, specific to the particular chilling application and food product being chilled. Typically, the exhaust gas temperature may vary between +20° F. (−6.6° C.) and −50° F. (−45.6° C.), with a preference for a warmer temperature which indicates a lack of colder cryogen gas breakthrough.

The thermocouple or RTD 41 is in electronic communication 47 (wired or wireless) with an electronic or digital controller 43, which receives a signal corresponding to the temperature of the exhaust gas 61. The controller 43, upon receiving a signal indicating that the temperature of the exhaust gas 61 has reached or dropped below a target value or range, sends a signal to a control valve 45 to vary the rate or speed at which the liquid cryogen is being delivered via conduit 23, 23A, 23B to the mixer/blender 51 by means of injectors 53. The overall efficiency of the chilling process can be improved, conserving energy and cryogen, as well as increasing batch to batch consistency, avoiding under-chilling or over-chilling product, by varying the rate of liquid cryogen delivery (slower or faster) based on the temperature of the exhaust gas 61 as the process proceeds. The rate of delivery may correspond to the pressure of the liquid cryogen being delivered.

The liquid conduit 23 may be associated with at least one actuated valve 27, such as an actuated ball valve. Optionally, further control of the delivery of liquid cryogen may be accomplished by pulsing the flow of liquid cryogen to the cryogen injectors 53 in the application during the chill cycle, by means of the actuated valve 27, and/or by control of the cryogen injectors 53 to pulse on/off according to system requirements. The actuated valve 27 and/or the cryogen injectors 53 may be preprogrammed to alternatingly open and close for a varying period of time, and/or may open and close for time periods calculated by the electronic controller 43 in response to the temperature of the exhaust gas. For purposes of illustration but not by limitation, the valve 27 may be pulsed on for the first minute of the chill cycle, then on for 50 seconds and off for 10 seconds the next minute, then on 40 seconds and off for 20 seconds (or any increment(s) of a minute), etc., as the chill cycle progresses. The periods on and off during the chill cycle may be varied as calculated for achieving the desired level of cooling based on the type and quantity of product being chilled, and/or may be calculated by the electronic controller 43 in response to the exhaust gas temperature.

Figure 2:
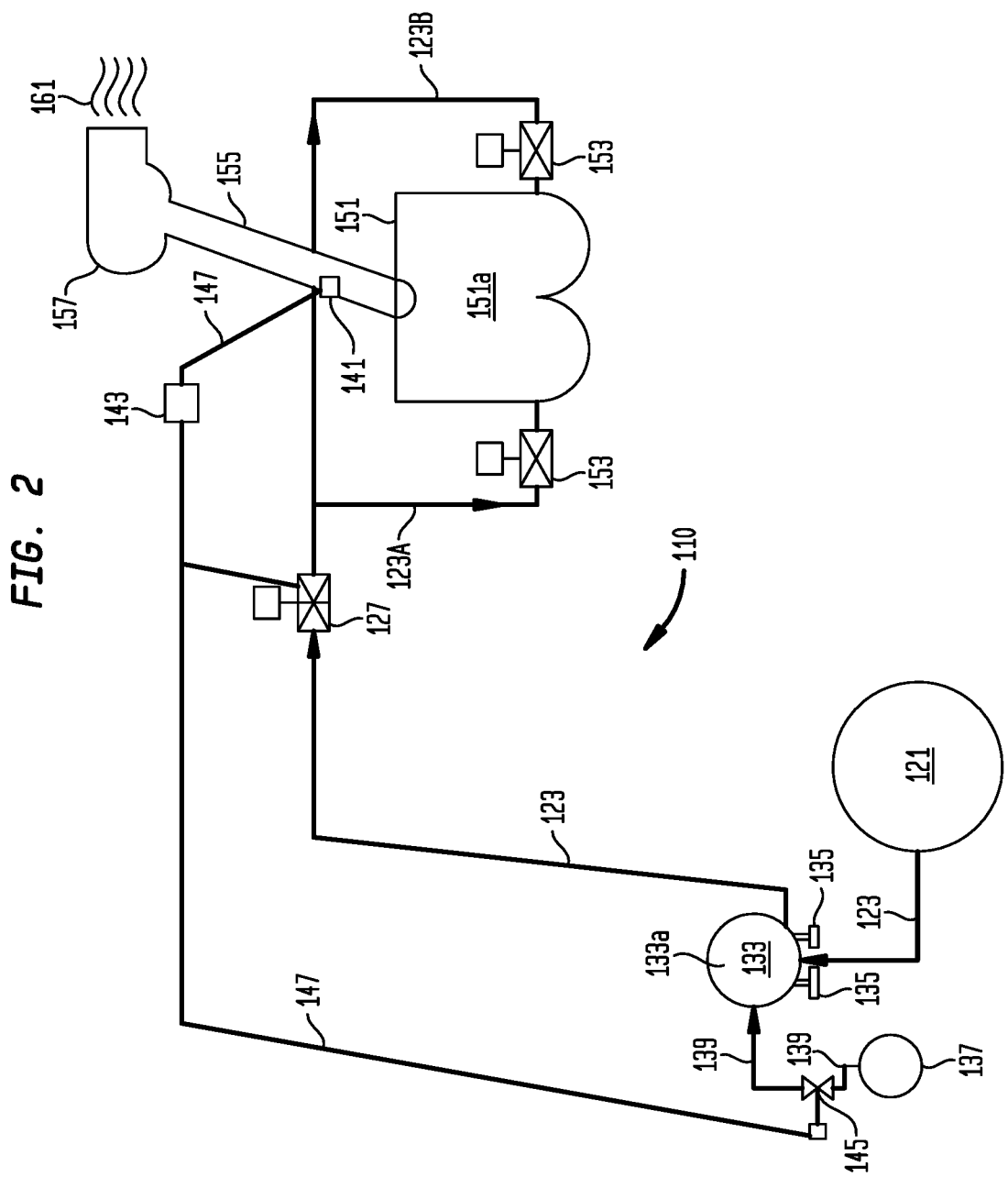
FIG. 2 is a schematic diagram of an alternate embodiment of the liquid cryogen delivery apparatus.

Referring to FIG. 2, the apparatus 110 comprises at least one liquid cryogen feed tank 121 in fluid communication with a liquid cryogen conduit 123 and a chilling application which in this embodiment also comprises a bottom injection, protein or meat mixer or blender 151. Feed tank 121 may comprise a low pressure, liquid nitrogen bulk storage tank, having a pressure typically on the order of about 10 psi (about 0.69 bar) to about 50 psi (3.45 bar). In some embodiments, the pressure of the feed tank is about 10 psi (about 0.69 bar) to about 35 psi (about 2.4 bar), with a preference for the lower pressures in the range. The liquid nitrogen may be provided to the conduit 123 at about negative 320° F. (−196° C.) to about negative 290° F. (−178° C.).

Located between feed tank 121 and mixer/blender 151 in controlling communication with conduit 123 is an assembly which controls or regulates the weight or quantity of liquid cryogen being delivered from feed tank 121 through conduit 123 to the mixer/blender 151. The assembly comprises at least a subcooling or conditioning vessel 133 situated on a weight measurement device or sensor 135 such as a weigh scale or load cell, configured to measure the weight of liquid cryogen and provide control feedback for the weight or quantity of liquid cryogen to be delivered to the mixer/blender through conduit 123. The quantity of liquid can be calculated based upon the type and weight of product to be chilled, and entered by an operator, or can be calculated and modified by an electronic or digital controller based on process parameters.

The assembly further includes a high-pressure nitrogen cryogen gas tank 137 in fluid communication with vessel 133 via a gas conduit 139. The pressure of nitrogen gas in the high-pressure gas tank 137 may be on the order of about 75 psi (about 5.17 bar) to about 200 psi (about 13.79 bar). A control valve 145 is associated with gas conduit 139 between the high-pressure gaseous nitrogen tank 137 and vessel 133, and is responsive to the temperature of the exhaust gas 161, as described below. The control valve 145 is configured for varying the pressure of the liquid cryogen in the vessel 133 by varying the flow of cryogen gas to the vessel. By way of illustration but not limitation, pressurized nitrogen cryogen gas may enter vessel 133 from conduit 139, proximate to the top of the vessel, so that pressure in the headspace 133a of vessel 133 forces the liquid cryogen into conduit 123, proximate to the bottom of the vessel. In this manner, the gaseous cryogen is not mixed with the liquid cryogen in vessel 133, so that substantially, if not only, liquid cryogen is delivered to conduit 123 and ultimately to mixer/blender 151.

Liquid cryogen is delivered to mixer/blender 151 via conduit 123 which may be split into two or more sections 123A, 123B to feed a plurality of liquid cryogen injectors 153 having nozzles (not shown) which inject the liquid cryogen directly into an interior 151a of the mixer/blender vessel 151 to contact the protein/meat being chilled therein. The protein/meat transfers its heat to the liquid cryogen, for example, but not limited to liquid nitrogen, which vaporizes upon heating into the corresponding gas, i.e., nitrogen gas. The gas passes from the mixer/blender 151 vessel to an exhaust duct 155; in some embodiments the exhaust gas 161 being drawn out of the interior 151a by a blower or exhaust fan 157. As the chilling process proceeds, the protein/meat reaches a temperature at which the release of its heat to the cryogen decreases, and colder cryogen gas escapes through the exhaust duct 155 with or as the exhaust gas 161.

According to the subject apparatus and method embodiments, the use of liquid cryogen in excess of what is practically needed can be avoided, but still achieve the desired amount of chilling of the protein/meat product. A temperature measuring device 141, such as a thermocouple or RTD, is positioned in exhaust duct 155 to detect when the exhaust gas 161 falls below a desired temperature or temperature range.

The thermocouple or RTD 141 is in electronic communication 147 (wired or wireless) with an electronic or digital controller 143, which receives a signal corresponding to the temperature of the exhaust gas 161. The controller 143, upon receiving a signal indicating that the temperature of the exhaust gas 161 has reached or dropped below a target value or range, sends a signal to control components, including a flow controller, namely a control valve 145, to vary the rate or speed, i.e. pressure, at which the liquid cryogen is being delivered via conduit 123, 123A, 123B to the mixer/blender 151 by means of injectors 153. This is accomplished by reducing the rate, or pressure, at which the nitrogen gas is fed from high pressure nitrogen gas tank 137 through gas conduit 139 to the conditioning vessel 133 to pressurize the vessel 133 and force the liquid nitrogen into conduit 123 as described above.

The liquid conduit 123 may be associated with at least one actuated valve 127, such as an actuated ball valve. Optionally, further control of the delivery of liquid cryogen may be accomplished by pulsing the flow of liquid cryogen to the cryogen injectors 153 in the application during the chill cycle, by means of the actuated valve 127, and/or by control of the cryogen injectors 153 to pulse on/off according to system requirements. The actuated valve 127 and/or the cryogen injectors 153 may be preprogrammed to alternatingly open and close for a varying period of time, and/or may open and close for time periods calculated by the electronic controller 143 in response to the temperature of the exhaust gas. For purposes of illustration but not by limitation, the valve 127 may be pulsed on for the first minute of the chill cycle, then on for 50 seconds and off for 10 seconds the next minute, then on 40 seconds and off for 20 seconds (or any increment(s) of a minute), etc., as the chill cycle progresses. The periods on and off during the chill cycle may be varied as calculated for achieving the desired level of cooling based on the type and quantity of product being chilled, and/or may be calculated by the electronic controller 143 in response to the exhaust gas temperature.

The overall efficiency of the chilling process can be improved, conserving energy and cryogen, as well as increasing batch to batch consistency, avoiding under-chilling or over-chilling product, by varying the rate of liquid cryogen delivery (slower or faster) based on the temperature of the exhaust gas as the chilling process proceeds.

In a first embodiment, provided is a subject delivery apparatus for delivering liquid cryogen to a chilling application comprising a liquid cryogen feed tank; a liquid cryogen conduit in fluid communication between the feed tank and the application; a weight measurement device for controlling the weight of liquid cryogen to be delivered to the application through the conduit; a flow controller for controlling the speed of delivery of the liquid cryogen to the application; wherein the application utilizes the liquid cryogen and produces an exhaust gas; a device for measuring the temperature of the exhaust gas, which device is in operative communication with the flow controller; wherein the flow controller is configured to vary the speed of delivery in response to the temperature of the exhaust gas.

The delivery apparatus for delivering liquid cryogen to a chilling application of the first embodiment may include an electronic controller configured to receive a signal corresponding to the temperature of the exhaust gas and to send a control signal to the flow controller.

The delivery apparatus for delivering liquid cryogen to a chilling application of either of the first or subsequent embodiments may include the weight measurement device being a flowmeter capable of control by an operator, and the flow controller is a control valve in operative communication with the temperature measuring device.

The delivery apparatus for delivering liquid cryogen to a chilling application of any of the first or subsequent embodiments may include the feed tank being in fluid communication with a vessel which is in fluid communication with the conduit, wherein the weight measurement device is a weigh scale supporting the vessel.

The delivery apparatus for delivering liquid cryogen to a chilling application of the previous embodiment may include the flow controller being configured to vary the pressure in the vessel to vary the speed of delivery of liquid cryogen to the conduit.

The delivery apparatus for delivering liquid cryogen to a chilling application of the previous two embodiments may include a high-pressure gaseous cryogen tank in fluid communication with the vessel via a gas conduit, wherein a pressure control device in the gas conduit between the high-pressure gaseous cryogen tank and the vessel is responsive to the temperature of the exhaust gas.

In a second embodiment, provided is a subject method for supplying liquid cryogen to a chilling application, the application utilizing the liquid cryogen and producing an exhaust gas, the method comprising: supplying liquid cryogen from a liquid cryogen feed tank to a liquid cryogen conduit in fluid communication between the feed tank and the application; controlling the weight of liquid cryogen to be delivered to the application through the conduit; controlling the speed of delivery of the liquid cryogen to the application by a flow controller; measuring the temperature of the exhaust gas with a device in operative communication with the flow controller; and varying the speed of delivery of the cryogen gas by the flow controller configured to vary the speed of delivery in response to the temperature of the exhaust gas.

The method of the second embodiment may include receiving a signal corresponding to the temperature of the exhaust gas and sending a control signal to the flow controller.

The method of the second and subsequent embodiment may include the feed tank being in fluid communication with a vessel which is in fluid communication with the conduit, and the flow controller varying the pressure in the vessel to vary the speed of delivery of liquid cryogen to the conduit.

The method of the second and subsequent embodiments may include a high-pressure gaseous cryogen tank being in fluid communication with the vessel via a gas conduit, wherein a pressure control device in the gas conduit between the high-pressure gaseous cryogen tank and the vessel is responsive to the temperature of the exhaust gas, the method including varying the pressure of the liquid cryogen in the vessel by the pressure control device varying the flow of cryogen gas to the vessel.

The method of the second and subsequent embodiments may include pulsing the delivery of liquid cryogen to the application at varying measured time intervals and/or exhaust gas temperature dependent intervals during a chilling cycle.

In a third embodiment is provided a delivery apparatus for delivering liquid nitrogen to a bottom injection mixer, comprising a low-pressure liquid nitrogen feed tank; a liquid nitrogen conduit in fluid communication between the low-pressure liquid nitrogen feed tank and the mixer, wherein the liquid nitrogen conduit feeds the liquid nitrogen to a plurality of injectors mounted to the mixer and communicating with the interior of the mixer; a weight measurement device for controlling the weight of liquid nitrogen to be delivered to the mixer via the injectors through the liquid nitrogen conduit; a flow controller for controlling the speed of delivery of the liquid nitrogen to the mixer via the injectors; wherein the mixer utilizes the nitrogen liquid and produces an exhaust gas; a device for measuring the temperature of the exhaust gas, which device is in operative communication with the flow controller; wherein the flow controller is configured to vary the speed of delivery of liquid nitrogen in response to the temperature of the exhaust gas.

The delivery apparatus for delivering liquid nitrogen of the third embodiment may include an electronic controller configured to receive a signal corresponding to the temperature of the exhaust gas and to send a control signal to the flow controller.

The delivery apparatus for delivering liquid nitrogen of the third embodiment and subsequent embodiments may include the weight measurement device being a flowmeter capable of control by an operator, and the flow controller is a control valve in operative communication with the temperature measuring device.

The delivery apparatus for delivering liquid nitrogen of the third embodiment and subsequent embodiments may include the feed tank being in fluid communication with a vessel which is in fluid communication with the liquid nitrogen conduit, wherein the weight measurement device is a weigh scale or load cell supporting the vessel.

The delivery apparatus for delivering liquid nitrogen of the third embodiment and subsequent embodiments may include the flow controller being configured to vary the pressure in the vessel to vary the speed of delivery of liquid nitrogen to the liquid nitrogen conduit.

The delivery apparatus for delivering liquid nitrogen of the third embodiment and subsequent embodiments may include a high-pressure gaseous nitrogen tank being in fluid communication with the vessel via a gas conduit, wherein a pressure control device in the gas conduit between the high-pressure gaseous nitrogen tank and the vessel is configured to be controlled by an electronic controller responsive to the temperature of the exhaust gas.

The delivery apparatus for delivering liquid nitrogen of the third embodiment and subsequent embodiments may include an actuated valve associated with the liquid nitrogen conduit and configured to pulse the delivery of liquid nitrogen to the injectors on and off at varying measured time intervals and/or exhaust gas temperature dependent intervals during a chilling cycle.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A delivery apparatus for delivering liquid cryogen to a chilling application comprising:
   a liquid cryogen feed tank;
   a liquid cryogen conduit in fluid communication between the liquid cryogen feed tank and the chilling application;
   a vessel in fluid communication with the liquid cryogen conduit and the liquid cryogen feed tank:
   a weight measurement device for controlling a weight of the liquid cryogen to be delivered to the chilling application through the liquid cryogen conduit, the weight measurement device selected from the group consisting of a weigh scale supporting the vessel, and a load cell supporting the vessel;
   a flow controller for controlling a speed of delivery of the liquid cryogen to the chilling application;
   wherein the chilling application uses the liquid cryogen to produce an exhaust gas;
   a high-pressure gaseous cryogen tank in fluid communication with the vessel via a gas conduit, wherein a pressure control device in the gas conduit between the high-pressure gaseous cryogen tank and the vessel is responsive to the temperature of the exhaust gas; and a device for measuring a temperature of the exhaust gas, the device in operative communication with the flow controller;

wherein the flow controller is configured to vary the speed of delivery of the liquid cryogen in response to the temperature of the exhaust gas.

2. The delivery apparatus of claim 1, further comprising an electronic controller configured to receive a signal corresponding to the temperature of the exhaust gas and to send a control signal to the flow controller.

3. The delivery apparatus of claim 1, wherein the flow controller is configured to vary a pressure in the vessel to vary the speed of delivery of the liquid cryogen to the liquid cryogen conduit.

4. A method for supplying liquid cryogen to a chilling application, the chilling application using the liquid cryogen and for producing an exhaust gas, the method comprising:

supplying liquid cryogen from a liquid cryogen feed tank to a liquid cryogen conduit in fluid communication between the liquid cryogen feed tank and the chilling application;

controlling a weight of the liquid cryogen to be delivered to the chilling application through the liquid cryogen conduit by a weight measurement device;

controlling a speed of delivery of the liquid cryogen to the chilling application by a flow controller;

measuring a temperature of exhaust gas with a device in operative communication with the flow controller; and varying the speed of delivery of the liquid cryogen by the flow controller configured to vary the speed of delivery in response to the temperature of the exhaust gas;

wherein a high-pressure gaseous cryogen tank is in fluid communication with a vessel via a gas conduit, and a pressure control device in communication with the gas conduit between the high-pressure gaseous cryogen tank and the vessel is responsive to the temperature of the exhaust gas, the method further comprising varying a pressure of the liquid cryogen in the vessel with a pressure control device varying a flow of cryogen gas to the vessel.

5. The method of claim 4, further comprising receiving a signal corresponding to the temperature of the exhaust gas, and sending a control signal to the flow controller.

6. The method of claim 4, wherein the liquid cryogen feed tank is in fluid communication with the vessel, the vessel is in fluid communication with the liquid cryogen conduit, and the flow controller is for varying the pressure in the vessel to vary the speed of delivery of the liquid cryogen to the liquid cryogen conduit.

7. The method of claim 4, further comprising pulsing the delivery of the liquid cryogen to the chilling application at a time interval during the chilling application selected from the group consisting of varying measured time intervals, exhaust gas temperature dependent intervals, and a combination thereof.

8. A delivery apparatus for delivering liquid nitrogen to a bottom injection mixer comprising:

a low-pressure liquid nitrogen feed tank;

a liquid nitrogen conduit in fluid communication between the low-pressure liquid nitrogen feed tank and the bottom injection mixer;

a vessel in fluid communication with the liquid nitrogen conduit and the low-pressure liquid nitrogen feed tank:

wherein the liquid nitrogen conduit feeds the liquid nitrogen to a plurality of injectors mounted to the bottom injection mixer and in communication with an interior of the bottom injection mixer;

a weight measurement device for controlling a weight of the liquid nitrogen to be delivered through the liquid nitrogen conduit and the plurality of injectors to the bottom injection mixer, the weight measurement device selected from the group consisting of a weigh scale supporting the vessel, and a load cell supporting the vessel;

a flow controller for controlling a speed of delivery of the liquid nitrogen to the bottom injection mixer through the injectors;

wherein the bottom injection mixer uses the liquid nitrogen and produces an exhaust gas;

a high-pressure gaseous nitrogen tank in fluid communication with the vessel via a gas conduit, and a pressure control device in communication with the gas conduit between the high-pressure gaseous nitrogen tank and the vessel configured to be controlled by an electronic controller responsive to a temperature of the exhaust gas; and a device for measuring the temperature of the exhaust gas, the device being in operative communication with the flow controller;

wherein the flow controller is configured to vary the speed of delivery of the liquid nitrogen in response to the temperature of the exhaust gas.

9. The delivery apparatus of claim 8, further comprising the electronic controller configured to receive a signal corresponding to the temperature of the exhaust gas and to send a control signal to the flow controller.

10. The delivery apparatus of claim 8, wherein the flow controller is configured to vary a pressure in the vessel to vary the speed of delivery of the liquid nitrogen to the liquid nitrogen conduit.

11. The delivery apparatus of claim 8, further comprising an actuated valve associated with the liquid nitrogen conduit and configured to pulse the delivery of the liquid nitrogen to the injectors during a chilling cycle at time intervals selected from the group consisting of varying measured time intervals, exhaust gas temperature dependent intervals, and a combination thereof.

* * * * *